United States Patent
Moses et al.

(10) Patent No.: US 8,972,137 B2
(45) Date of Patent: Mar. 3, 2015

(54) METHOD AND APPARATUS FOR CONTROLLING A CLUTCH IN FOUR-WHEEL DRIVE VEHICLES

(75) Inventors: Edwin Moses, Farmington Hills, MI (US); Loren M. Trotter, Linden, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/405,432

(22) Filed: Feb. 27, 2012

(65) Prior Publication Data

US 2013/0226422 A1 Aug. 29, 2013

(51) Int. Cl.
*G06F 7/70* (2006.01)
*B60T 8/32* (2006.01)

(52) U.S. Cl.
USPC .................................. 701/70; 701/93; 701/62

(58) Field of Classification Search
USPC .................................... 701/70, 93, 67, 53, 62
See application file for complete search history.

(56) References Cited

U.S. PATENT DOCUMENTS

| | | |
|---|---|---|
| 2004/0067818 A1 | 4/2004 | Obermeier-Hartmann et al. |
| 2006/0252598 A1 | 11/2006 | Eckle et al. |
| 2006/0293824 A1* | 12/2006 | Steen et al. ...................... 701/70 |
| 2007/0233351 A1* | 10/2007 | Wang ............................... 701/70 |
| 2011/0125376 A1* | 5/2011 | Chappell et al. ................ 701/65 |
| 2011/0130938 A1* | 6/2011 | Seok et al. ....................... 701/93 |

FOREIGN PATENT DOCUMENTS

EP    1607650 A1    12/2005

OTHER PUBLICATIONS

International Search Report and Written Opinion dated May 22, 2013 for International Application No. PCT/US2013/025083, International Filing Date Feb. 7, 2013.

* cited by examiner

*Primary Examiner* — Thomas G Black
*Assistant Examiner* — Brian J Broadhead
(74) *Attorney, Agent, or Firm* — Ralph E Smith

(57) ABSTRACT

A system and method for detecting that a four-wheel drive manual transmission vehicle is being operated in a manner that could cause a clutch over-speed problem. Upon detecting that the vehicle is being operated in the manner that could cause the clutch over-speed problem, the system and method activate a braking countermeasure to remove the potential problem. In addition, a fault code may be stored for subsequent diagnostic measures and/or a fault indicator may be used to alert the driver of the problem.

20 Claims, 2 Drawing Sheets

METHOD AND APPARATUS FOR CONTROLLING A CLUTCH IN FOUR-WHEEL DRIVE VEHICLES

FIELD

The present disclosure relates to clutch over-speed protection for vehicles with manual transmission, particularly four wheel drive vehicles with a low range mode of operation.

BACKGROUND

Four-wheel drive (4WD) vehicles are four-wheeled vehicles with a drivetrain that may be controlled to allow all four wheels to receive torque from the engine at the same time. Four-wheel drive vehicles are typically placed from a two-wheel drive mode, where torque is only applied to two of the wheels, to the four-wheel drive mode by the driver when more traction is desired. Currently, the term all-wheel drive (AWD) is used to refer to a vehicle that operates in a four-wheel drive mode "full time" without the need for the driver to activate the four-wheel drive mode. Four-wheel drive vehicles are also known or advertised as four-by-four (4×4) vehicles.

When switched into four-wheel drive mode, the vehicle's transfer case will lock the front-axle driveshaft to the rear-axle driveshaft, forcing the wheels to spin at the same speed. Some transfer cases also contain an additional set of gears providing the vehicle with a low range four-wheel drive mode (4-LO). The low range gear ratio gives the vehicle extra torque and a slow output speed, which allows drivers to slowly and smoothly crawl up very steep hills and dunes, or drive over rocky terrain.

The low range mode works well for climbing and descending hills and dunes. Problems may arise for manual four-wheel drive vehicles, however, if the driver decides to coast down the hill or dune while depressing the clutch pedal when the vehicle is in the low range mode and still in gear. This situation will lead to excessive spinning of the clutch disk (e.g., almost two-times its specified rate), often referred to as over-speeding the clutch, which could cause the clutch to burst. Compounding the issue is the fact that the clutch over-speed condition may occur at low speeds and often times the driver may not even be aware of the potential problem. Repairing or replacing a burst clutch can be expensive and could cause the vehicle manufacturer to lose goodwill with the driver (even though it is the driver's actions that necessitated the repairs).

Accordingly, there is a need and desire to detect when driving and operating conditions are detrimental to the vehicle's clutch in a four-wheel drive manual transmission vehicle and to implement countermeasures to avoid damage to the clutch.

SUMMARY

In one form, the present disclosure provides a method of detecting and modifying an operating condition associated with a clutch over-speed condition in a four-wheel drive vehicle. The method comprises determining that a current vehicle speed is greater than a last known vehicle speed, the vehicle is in a low range operating mode, the vehicle clutch is being depressed, and the vehicle is not in neutral; and applying the vehicle's brakes if it is determined that the current vehicle speed is greater than the last known vehicle speed, the vehicle is in the low range operating mode while the vehicle clutch is being depressed, and the vehicle is not in neutral.

The present disclosure also provides a clutch over-speed detection and protection apparatus for a four-wheel drive vehicle. The apparatus comprises an engine controller adapted to determine that the current vehicle speed is greater than a last known vehicle speed, the vehicle is in a low range operating mode, the vehicle clutch is being depressed, and the vehicle is not in neutral; and apply the vehicle's brakes if it is determined that the current vehicle speed is greater than the last known vehicle speed, the vehicle is in the low range operating mode while the vehicle clutch is being depressed, and the vehicle is not in neutral.

In one form, the brakes are applied to maintain the vehicle's speed within a predetermined speed limit of the last known vehicle speed. The predetermined speed limit may be based on the vehicle's current gear ratio. The predetermined speed limit is about three to five miles per hour when the vehicle is in a first gear ratio.

In another form, the last known vehicle speed is a last known speed when the vehicle clutch was engaged and the vehicle was not in neutral.

In another form, the method and apparatus store a fault code indicative of a clutch over-speed condition. In yet another form, the method and apparatus output, to a driver of the vehicle, an indicator indicative of a clutch over-speed condition. In another alternative, the method and apparatus determine whether the vehicle is, or is not, in neutral based on a signal from a transmission neutral sensor.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
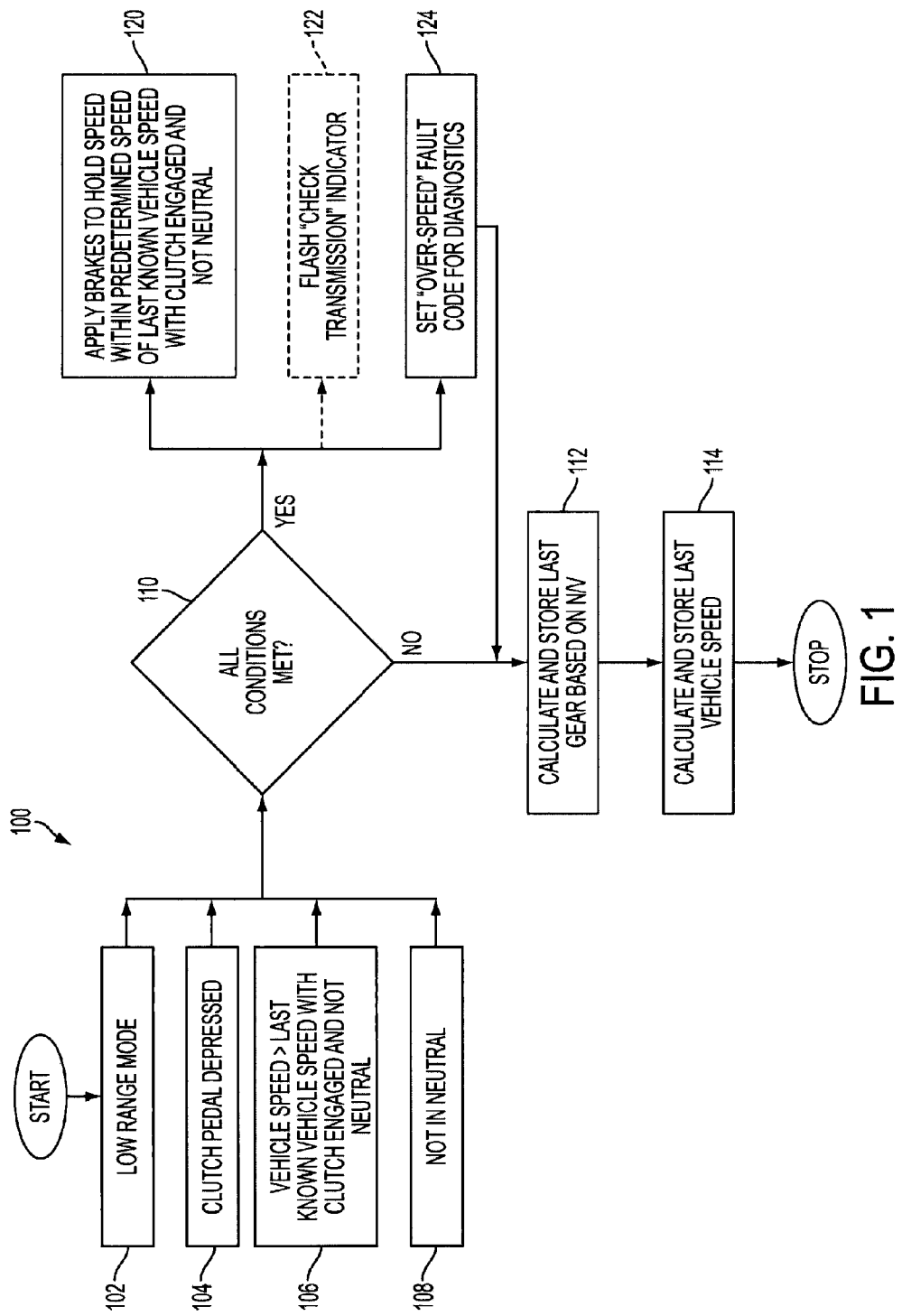
FIG. 1 is a flowchart of a method in accordance with an embodiment disclosed herein that detects a driving and operating condition that could lead to a clutch over-speed problem and automatically corrects the condition to avoid the problem.

The technology disclosed herein is preferably applied to a four-wheel drive vehicle having a manual transmission and a transfer case providing a low range operating mode. Non-limiting examples of such a vehicle include various models of the Jeep® Wrangler, Jeep® Wrangler Unlimited, Jeep® Grand Cherokee, Jeep® Liberty, Jeep® Compass, Jeep® Patriot and the Dodge® RAM. FIG. 1 illustrates a method 100 of detecting a driving and operating condition that could lead to a clutch over-speed problem and automatically modifying the driving condition to minimize or prevent the problem. In a desired embodiment, the method 100 is implemented in software, stored in a computer readable medium (e.g., memory 222 illustrated in FIG. 2, which could be a random access memory (RAM) device, non-volatile random access memory (NVRAM) device, or a read-only memory (ROM) device) and executed by a processor such as the engine controller 220 illustrated in FIG. 2. The method 100 can be executed periodically, at a predetermined rate deemed suitable for success, as part of the engine controller's 220 normal operating processing or background diagnostic processing.

As will become apparent, the method 100 contains steps (e.g., steps 102-114) for monitoring certain driving and operating conditions that could lead to the clutch over-speed problem mentioned above. The method 100 also contains a step (e.g., step 120) for modifying the driving conditions to avoid the clutch over-speed problem and a step (e.g., step 124) for storing a fault code so that a diagnostic program can detect that the vehicle was being operated in a manner that could lead to the clutch over-speed problem. Optionally, the method can also provide an indication to the driver that the vehicle's transmission may need to be serviced (e.g., step 122).

The method 100 determines: whether the vehicle is operating in the low range mode (step 102), whether the clutch pedal is depressed (step 104), whether the vehicle speed is greater than the last known vehicle speed when the clutch was engaged and the transmission was not in neutral (step 106) and whether the transmission is currently not in neutral (step 108). As is discussed below in more detail, determining whether the transmission is in neutral or not will be accomplished using a transmission neutral sensor or similar device. It should be appreciated that while FIG. 1 illustrates these steps in a particular order, the disclosed embodiments are not limited to the exact order illustrated.

At step 110, the method 100 determines if all of the conditions have been met. That is, step 110 will determine if the vehicle is operating in the low range mode with the clutch pedal depressed while the transmission is currently not in neutral and that the vehicle speed is greater than the last known vehicle speed (when the clutch was engaged and the transmission was not in neutral). If all of these conditions are true at step 110, the method 100 will continue at step 120 where the engine controller 220 causes the brakes to be applied. The brakes are applied to slow down and hold the vehicle's speed within a predetermined speed limit over the last known vehicle speed (when the clutch was engaged and the transmission was not in neutral). In one example embodiment, when the transmission is in first gear, the predetermined speed limit is about 3 to 5 miles per hour (mph) over the last known speed. It should be appreciated that this predetermined speed limit hysteresis is gear dependent. As such, a table of predetermined speed limits, one limit for each available gear ratio, can be created and stored in a memory (e.g., memory 222) or hardware and used at step 120.

Figure 2:
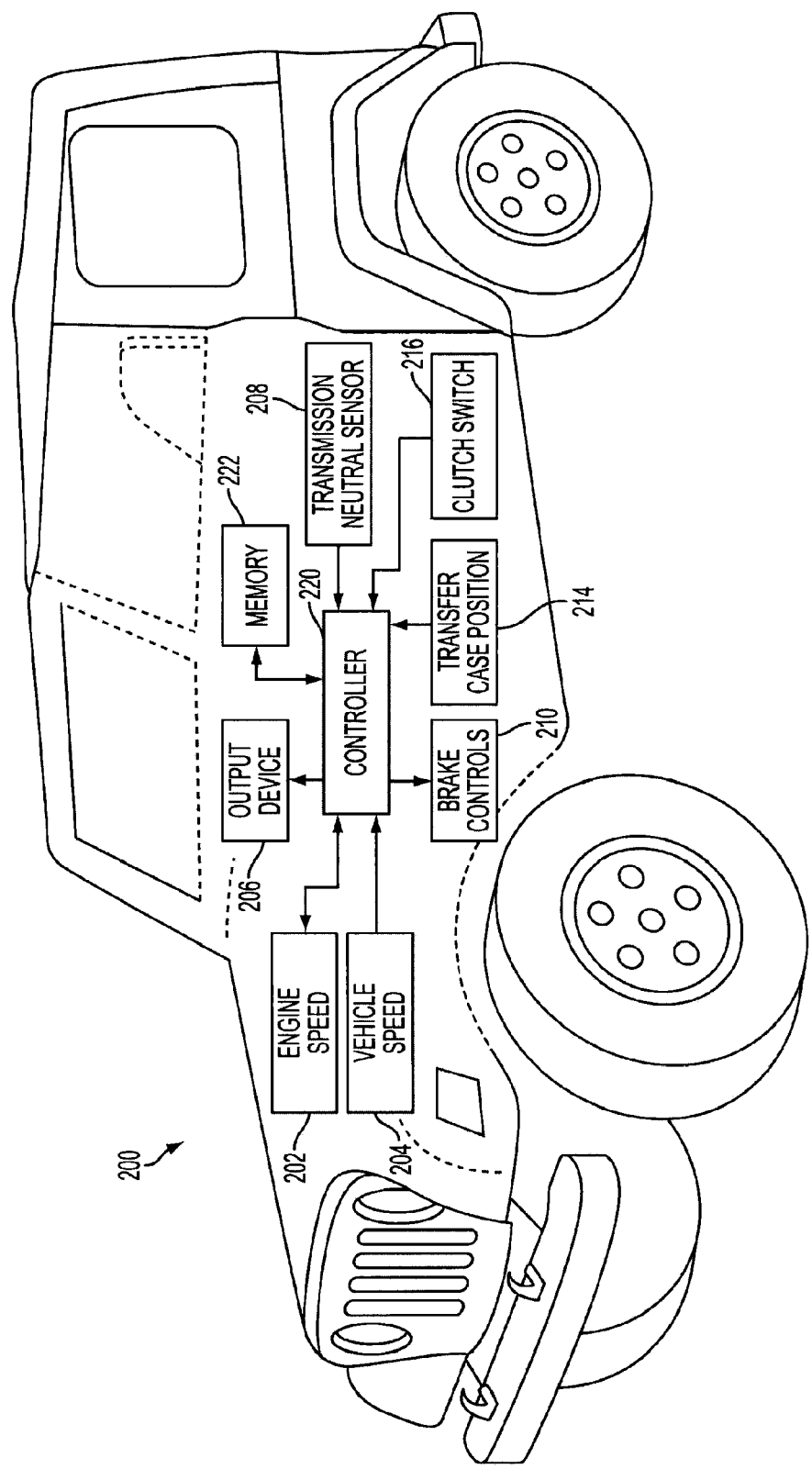
FIG. 2 is an illustration of a vehicle constructed in accordance with an embodiment disclosed herein that is adapted to implement the method of FIG. 1.

The method 100 may perform the optional step of flashing a "Check Transmission" indicator on the vehicle's dashboard if it is equipped with a mechanism for displaying/outputting the indicator (e.g., an output device 206 as shown in FIG. 2). The indicator can be flashed while the clutch over-speed conditions exist or can remain lit until the driver has the vehicle serviced. The same indicator, or another indicator, can also be used to alert the driver to manually brake the vehicle. At step 124, an "Over-Speed" fault code is stored in a memory (e.g., memory 222) or hardware registers. The stored fault code can than be retrieved by the dealer's service department to determine if the clutch has been damaged by an over-speed condition.

After step 124, or if step 110 determines that one or more of the conditions in steps 102-108 are not met, the method 100 continues at step 112 where the last known gear is calculated based on the ratio of vehicle engine speed to road speed (N/V). The calculated last known gear is stored e.g., in a memory 222 or a register for subsequent use (in e.g., step 120). At step 114, the method 100 calculates and stores the last known vehicle speed. If the clutch is engaged and the transmission is not in neutral, the last known vehicle speed will also be stored as the last known vehicle speed with clutch engaged and transmission not in neutral. The method 100 is complete and can be executed again at the predetermined rate.

FIG. 2 illustrates a vehicle 200 constructed in accordance with an embodiment disclosed herein. As was discussed above, the vehicle 200, particularly its engine controller 220, is adapted to execute the method 100 of FIG. 1. The engine controller 220, which may be a programmed processor, is connected to receive engine speed 202 and vehicle speed 204. The controller 220 is also connected to an output device 206, a transmission neutral sensor 208, brake controls 210, a transfer case 214 and a clutch switch 216. The transmission neutral sensor 208 is connected to the transmission (not shown). The controller 220 may be coupled to a memory device 222 used to store vehicle and operating data, calculated data for steps 112, 114, the speed limit hysteresis table used in step 120, diagnostics information, programs and other data or source code needed to implement the method 100. Although shown as a separate component, the memory device 222 may also be part of the engine controller 220. The engine controller 220 may also include internal RAM, NVRAM and ROM memory devices. The transmission neutral sensor 208 may be a sensor or switch and should not be limited to any particular type of device.

The controller 220 can input engine speed 202 from the engine and vehicle speed 204 from a vehicle sensor. The controller 220 can send a signal to the output device 206 when it is time to flash/output the "Check Transmission" indicator (e.g., at step 122). The controller 220 can input a neutral indication signal from the neutral sensor 208. One value of the neutral indication signal will indicate that the transmission is in neutral and a second value will indicate that the transmission is not in neutral. The neutral indication signal is used in step 108 to determine if the transmission is in neutral or not. The neutral sensor 208 can be a switch similar to the ones currently used for vehicles in Europe for assisting with Start/Stop technology.

The controller 220 also inputs a low range mode signal from the transfer case 214 indicating whether or not the transfer case 214 has been put in low range. One value of the low range mode signal will indicate that the vehicle is in the low range mode and a second value will indicate that the vehicle is in another mode. The low range mode signal is used in step 102 to determine if the is in low range mode or not.

The controller 220 also inputs a clutch depressed indication signal from the clutch switch 216 indicating whether or not the clutch pedal is currently being depressed or not. One value of the clutch depressed indication signal will indicate that the clutch is being depressed and a second value will indicate that the clutch is not being depressed. The clutch depressed indication signal is used in step 104 to determine if the clutch is being depressed or not.

As can be seen, the method and vehicle system described herein provide a technique for automatically preventing a driver from damaging a clutch due to clutch over-speed caused by an improper combination of driving and operating conditions. Although the disclosed embodiments have been described with use with four-wheel drive vehicles, it should be appreciated that the embodiments could also be used with all-wheel drive and other types of manual transmission vehicles implementing a low range mode of operation, if desired.

What is claimed is:

1. A method of detecting and modifying an operating condition associated with a clutch over-speed condition in a four-wheel drive vehicle, said method comprising:

determining that a current vehicle speed is greater than a last known vehicle speed, the vehicle is in a low range operating mode, a vehicle clutch pedal is being depressed, and the vehicle is not in neutral; and applying brakes of the vehicle if it is determined that the current vehicle speed is greater than the last known vehicle speed, the vehicle is in the low range operating mode, the vehicle clutch pedal is being depressed, and the vehicle is not in neutral.

2. The method of claim 1, wherein the brakes are applied to maintain the vehicle's speed within a predetermined speed limit of the last known vehicle speed.

3. The method of claim 2, wherein the predetermined speed limit is based on a current gear ratio of the vehicle.

4. The method of claim 2, wherein the predetermined speed limit is about three to five miles per hour when the vehicle is in a first gear ratio.

5. The method of claim 1, wherein the last known vehicle speed is a last known speed when the vehicle clutch was engaged and the vehicle was not in neutral.

6. The method of claim 1, further comprising storing a fault code indicative of the clutch over-speed condition.

7. The method of claim 1, further comprising outputting to a driver an indicator indicative of the clutch over-speed condition.

8. The method of claim 1, further comprising the steps of:
determining a last known gear of the vehicle based on ratio of vehicle engine speed to road speed; and
determining the last known vehicle speed.

9. The method of claim 1, wherein determining whether the vehicle is not in neutral is based on a signal from a transmission neutral sensor.

10. The method of claim 1, wherein determining whether the clutch is depressed is based on a signal from a clutch switch.

11. A clutch over-speed detection and protection apparatus for a four-wheel drive vehicle, said apparatus comprising:
an engine controller adapted to:
determine that a current vehicle speed is greater than a last known vehicle speed, the vehicle is in a low range operating mode, a vehicle clutch pedal is being depressed, and the vehicle is not in neutral; and
apply brakes of the vehicle if it is determined that the current vehicle speed is greater than the last known vehicle speed, the vehicle is in the low range operating mode, the vehicle clutch pedal is being depressed, and the vehicle is not in neutral.

12. The apparatus of claim 11, further comprising a transmission neutral sensor connected to the engine controller and a transmission of the vehicle, said transmission neutral sensor outputting a signal to the engine controller, said signal having a first state indicating that the transmission is not in neutral and a second state indicating that the transmission is in neutral.

13. The apparatus of claim 11, wherein the controller sends a signal to a brake control such that the brakes are applied to maintain the vehicle's speed within a predetermined speed limit of the last known vehicle speed.

14. The apparatus of claim 13, wherein the predetermined speed limit is based on a current gear ratio of the vehicle.

15. The apparatus of claim 13, wherein the predetermined speed limit is about three to five miles per hour when the vehicle is in a first gear ratio.

16. The apparatus of claim 11, wherein the controller inputs the current vehicle speed from a speed sensor and the last known vehicle speed is a last known speed when the vehicle clutch was engaged and the vehicle was not in neutral.

17. The apparatus of claim 11, further comprising a memory for storing a fault code indicative of the clutch over-speed condition.

18. The apparatus of claim 11, further comprising an output device for outputting an indicator indicative of the clutch over-speed condition.

19. The apparatus of claim 11, further comprising a clutch switch connected to the engine controller, said clutch switch outputting a signal to the engine controller, said signal having a first state indicating that the clutch is depressed and a second state indicating that the clutch is not depressed.

20. The apparatus of claim 11, wherein the controller is further adapted to:
determine a last known gear of the vehicle based on ratio of vehicle engine speed to road speed; and
determine the last known vehicle speed.

\* \* \* \* \*